United States Patent
Yoon

(10) Patent No.: US 6,522,899 B1
(45) Date of Patent: Feb. 18, 2003

(54) MUTING METHOD IN RADIO COMMUNICATION TERMINAL

(75) Inventor: Kyeong-Cheol Yoon, Kyongsangbuk-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/470,868

(22) Filed: Dec. 23, 1999

(30) Foreign Application Priority Data

Dec. 30, 1998 (KR) .............................................. 98-60911

(51) Int. Cl.⁷ ................................................. H04B 1/38
(52) U.S. Cl. ........................................ 455/566; 455/575
(58) Field of Search ................................ 455/550, 565, 455/566, 567, 575, 90, 238.1, 412, 414, 415

(56) References Cited

U.S. PATENT DOCUMENTS

| | | | | |
|---|---|---|---|---|
| 5,822,702 A | * | 10/1998 | Kobayashi | 455/550 |
| 5,867,796 A | * | 2/1999 | Inutsuka | 455/567 |
| 6,108,532 A | * | 8/2000 | Matsuda et al. | 455/238.1 |

* cited by examiner

*Primary Examiner*—Thanh Cong Le
(74) *Attorney, Agent, or Firm*—Dilworth & Barrese, LLP

(57) ABSTRACT

A muting method for a radio communication terminal. The method comprises setting a mute function; upon detection of a ring signal, muting bell and vibration; storing in a memory an absent message representing that there was a call during absence; and displaying the stored absent message on a display when the mute function is released.

11 Claims, 3 Drawing Sheets

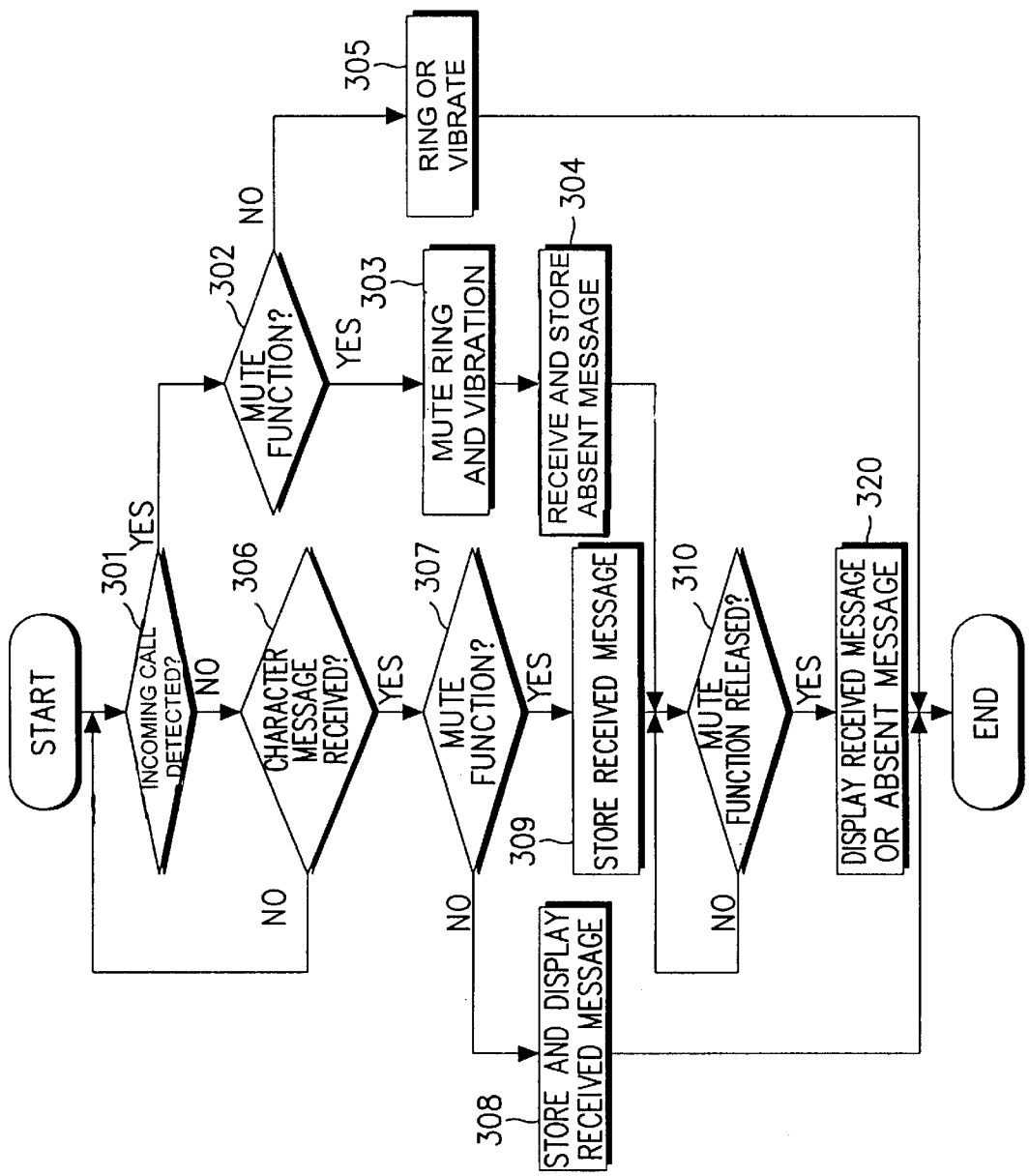

MUTING METHOD IN RADIO COMMUNICATION TERMINAL

PRIORITY

This application claims priority to an application entitled "Muting Method in Radio Communication Terminal" filed in the Korean Industrial Property Office on Dec. 30, 1998 and assigned Ser. No. 98-60911, the contents of which are hereby incorporated by reference.

BACKGROUND OF THE INVENTION

1. Field of the Invention

The present invention relates generally to a radio communication terminal with a mute function, and in particular, to a muting method for storing a received message while a mute function is set and displaying the stored received message on a display when the mute function is released.

2. Description of the Related Art

A mobile radio communication terminal, such as a portable telephone, issues an alert to the user, which can be in the form of a vibration or an audio alert (referred to generically as a "ring") upon receipt of an incoming call. When the user is in a meeting, for example, he may set the radio communication terminal to the vibration mode or turn off the radio communication terminal completely so that an incoming call will not cause the phone to ring and thereby interrupt the meeting. Even when the radio communication terminal is set to the vibration mode, the vibration caused by a call receipt may still interrupt the user in such a setting. However, when the radio communication terminal is turned off entirely, the user cannot recognize receipt of an incoming call at all.

SUMMARY OF THE INVENTION

It is, therefore, an object of the present invention to provide a muting method for a radio communication terminal, where upon receipt of an incoming call or a message while a mute function is set, the radio communication terminal stores the call or message-received in a memory and then displays the call or message-received state when the mute function is released.

To achieve the above object, there is provided a muting method for a radio communication terminal. The method comprises setting a mute function; upon detection of an incoming call, muting the ring and/or vibration features; storing in a memory an absent message that there was a call while the mute function was set; and displaying the stored absent message on a display when the mute function is released.

BRIEF DESCRIPTION OF THE DRAWINGS

The above and other objects, features and advantages of the present invention will become more apparent from the following detailed description when taken in conjunction with the accompanying drawings in which:

FIG. 3 is a flow chart illustrating a procedure for performing a mute function according to an embodiment of the present invention.

DETAILED DESCRIPTION OF THE PREFERRED EMBODIMENT

Figure 1:
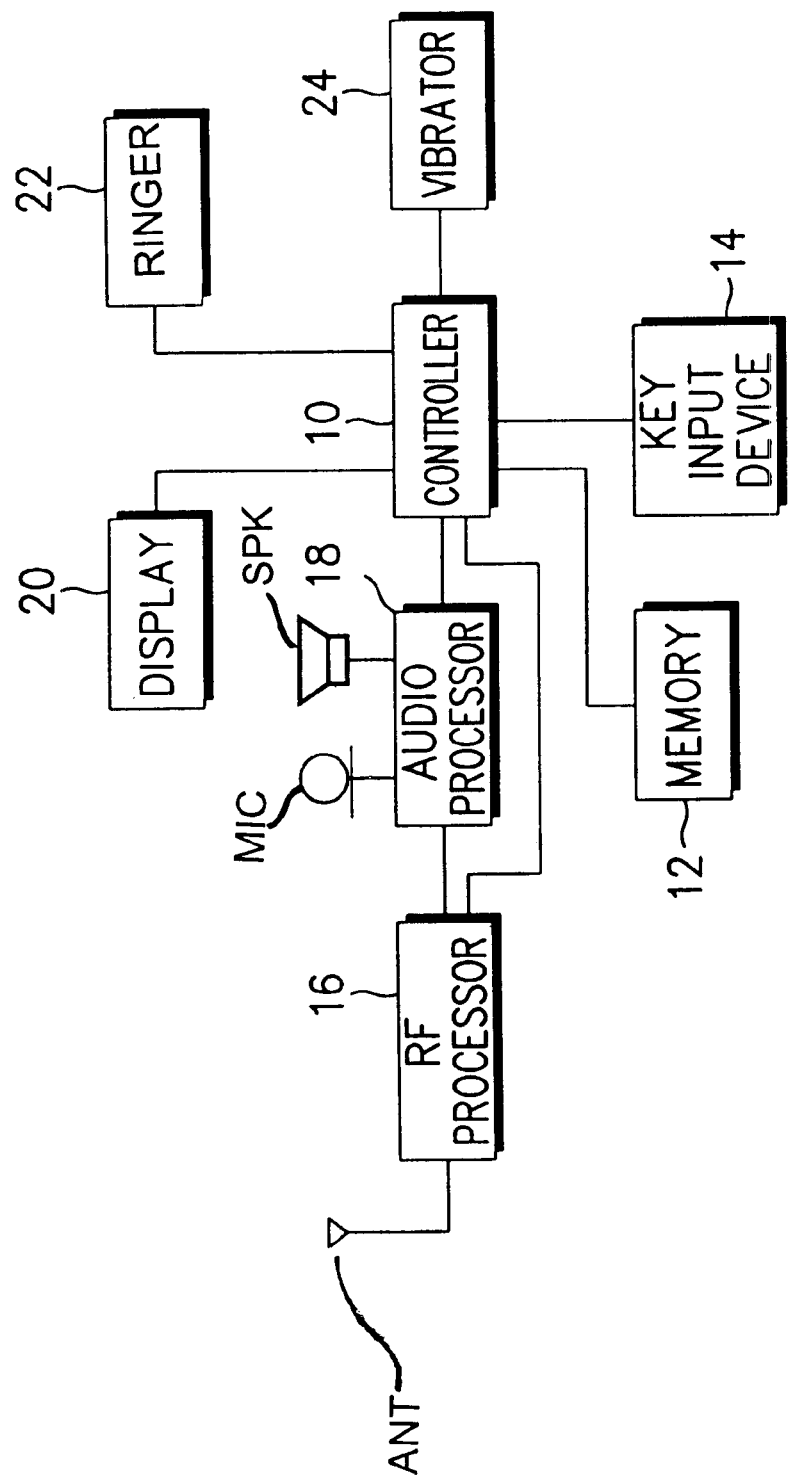
FIG. 1 is a block diagram illustrating a radio communication terminal to which the present invention is applicable.

FIG. 1 shows a block diagram of a radio communication terminal according to an embodiment of the present invention. Referring to FIG. 1, a controller 10 controls the overall operation of the radio communication terminal. In particular, the controller 10 sets a mute function when a mute key is pressed on key input device 14, for example. With the mute function set, upon receipt of an incoming call or a message, the controller 10 generates a mute control signal that suppresses the vibration and/or ring and prevents the call or message-received state from being displayed on the terminal's display 20.

A memory 12 includes a ROM (Read Only Memory) for storing a control program of the radio communication terminal, and a RAM (Random Access Memory) for storing data processed while the control program is executed by the controller 10. In particular, the memory 12 stores programming for performing a mute function according to the present invention.

A key input device 14 includes a plurality of numeric keys and function keys, and provides input data according to the user's operation of the keys. The data input at the key input device 14 is provided to the controller 10.

An RF processor 16 transmits a transmission signal to a base station through an antenna ANT, and processes a signal received from the base station through the antenna. An audio processor 18, under the control of the controller 10, modulates an audio (voice) signal input through a microphone MIC into a radio signal, which is provided to the RF processor 16 for transmission. Audio processor 18 also demodulates a radio signal received via the antenna and processed by the RF processor 16 to provide an audio signal to a speaker SPK.

The display 20 displays various information to the user, including whether a call or message has been received. The display 20 is under the control of the controller 10. The display 20 is comprised of an LCD (Liquid Crystal Display) for displaying various information and an LED (Light Emitting Diode) for enabling the user to see the displayed information even at night.

Figure 2:
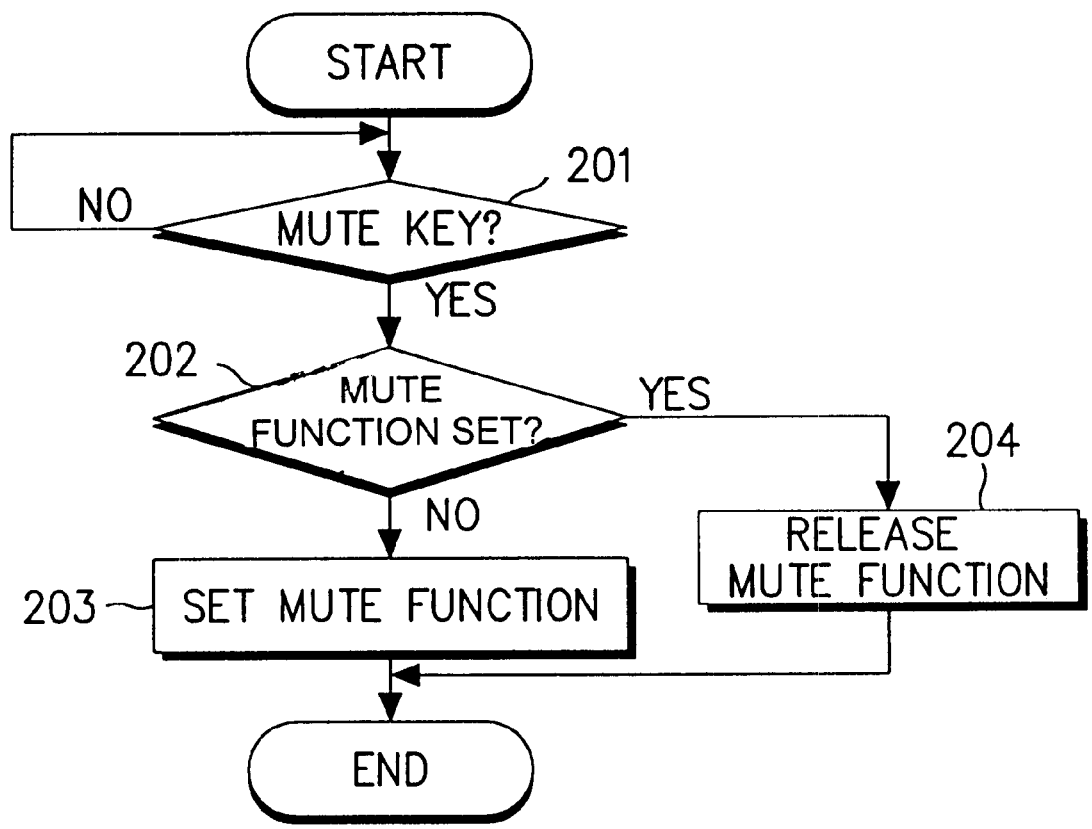
FIG. 2 is a flow chart illustrating a procedure for setting a mute function according to an embodiment of the present invention.

FIG. 2 shows a procedure for setting a mute function according to an embodiment of the present invention, and FIG. 3 shows a procedure for performing a mute function according to an embodiment of the present invention.

Referring to FIG. 2, a mute key of the key input device 14 is used to turn the mute function on and off. The controller 10 determines in step 201 if the mute key is pressed. When the mute key is pressed, the controller 10 determines the current state of the mute function, namely whether the mute function is set or not (step 202). When the mute function is not set, the controller 10 sets the mute function in step 203 and ends the procedure. However, if it is determined in step 202 that the mute function is set, the controller 10 releases the mute function in step 204 and ends the procedure.

Referring to FIG. 3, the controller 10 determines in step 301 whether or not the RF processor 16 has detected a signal indicating an incoming call. When the incoming call signal is detected, the controller 10 determines in step 302 whether the mute function is set or not. When the mute function is not set, the controller 10 activates a ringer (which supplies a ring or audio alert) 22 or a vibrator 24 in step 305, depending on whether the operation mode is set to the ring mode or the vibration mode. Where it is determined in step 302 that the mute function is set, the controller 10 mutes (or inactivates) the ringer 22 and the vibrator 24 in step 303.

When the mute function is set, the user will not answer an incoming call because he is not alerted to receipt of the incoming call. Therefore, after a lapse of a predetermined time, the base station will send the radio communication terminal an absent message indicating that there was a call during absence. Then, in step 304, the controller 10 stores the absent message received in the memory 12, instead of displaying the absent message on the display 20.

If it is determined in step 301 that a signal indicating an incoming call has not been detected, the controller 10 determines in step 306 whether a character message has been received. If a character message has not been received, the controller 10 returns to step 301. When a character message is received, the controller 10 determines whether or not the mute function is set in step 307. When the mute function is not set, the controller 10 stores the received character message in the memory 12 and displays the message on the display 20, as shown in step 308. When mute function is set, however, the controller 10 stores the received character message in the memory 12 but does not display the message on the display 20, as shown in step 309.

Where either an absent message or a character message is stored in steps 304 or 309 because the mute function is set, at some point the user will release the mute function. To do so, as described above with respect to the embodiment of FIG. 1, the user presses the mute key in the key input device 14. The controller 10 determines in step 310 whether the mute function is released or not. When the mute function is released, the controller 10 retrieves the received character message or the absent message stored in the memory 12 and displays the message on the display 20 in step 320.

As described above, if an incoming call is received while the mute function is set, the radio communication terminal mutes the ringer and the vibrator and stores an absent message in the memory instead of displaying the message on the display. Further, when a character message is received while the mute function is set, the mobile communication terminal stores the received character message in the memory instead of displaying the message on the display. Thereafter, when the mute function is released, the radio communication terminal displays the stored message on the display. Therefore, the user experiences no distractions or interruptions when the mute function is set.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A muting method in a radio communication terminal, comprising the steps of:
    (a) setting a mute function;
    (b) upon detection of a signal indicating an incoming call, muting a call indicator;
    (c) storing in a memory an absent message representing that there was a call; and
    (d) displaying the stored absent message on a display when the mute function is released.

2. The method of claim 1, wherein the step of muting a call indicator includes muting an audio alert.

3. The method of claim 1, wherein the step of muting a call indicator includes disabling a vibrator.

4. The muting method as claimed in claim 1, wherein step (a) comprises the steps of:
    receiving a user input via depression by the user of a mute key;
    determining that the mute function is not set; and
    setting the mute function.

5. The muting method as claimed in claim 1, wherein releasing the mute function in step (d) includes the steps of:
    receiving a user input via depression by the user of a mute key;
    determining that the mute function is set; and
    releasing the mute function.

6. A muting method in a radio communication terminal, comprising the steps of:
    (a) setting a mute function;
    (b) upon receipt of a character message, storing the received character message in a memory; and
    (c) displaying the stored character message on a display when the mute function is released.

7. The muting method as claimed in claim 6, wherein the step (a) comprises the steps of:
    receiving a user input via depression by the user of a mute key;
    determining that the mute function is not set; and
    setting the mute function.

8. The muting method as claimed in claim 6, wherein releasing the mute function in step (c) includes the steps of:
    receiving a user input via depression by the user of a mute key;
    determining that the mute function is set; and
    releasing the mute function.

9. A radio communication terminal having a muting feature, said terminal comprising:
    (a) a ringer;
    (b) a controller that controls the ringer and has a mute state, the controller having an input for receiving a signal indicating an incoming call, the controller driving the ringer upon receipt of an incoming call signal when the mute state is in an off state; and
    (c) a memory that interfaces with the controller, the controller storing an absent message after receipt of an incoming call signal when the mute state is in an on state, the controller retrieving the stored absent message and displaying the message on a display when the mute state is changed from the on state to the off state.

10. The radio communication terminal as claimed in claim 9, the terminal further comprising a user input that interfaces with the controller, the user input transmitting a control signal to the controller, the controller changing the mute state upon receipt of the control signal.

11. The radio communication terminal as claimed in claim 9, wherein the user input includes at least one key.

* * * * *